(12) United States Patent
Quadracci et al.

(10) Patent No.: US 9,053,159 B2
(45) Date of Patent: Jun. 9, 2015

(54) NON-CONFORMANCE ANALYSIS USING AN ASSOCIATIVE MEMORY LEARNING AGENT

(75) Inventors: Leonard J. Quadracci, Seattle, WA (US); Brian Warn, Seattle, WA (US)

(73) Assignee: The Boeing Company, Chicago, IL (US)

(*) Notice: Subject to any disclaimer, the term of this patent is extended or adjusted under 35 U.S.C. 154(b) by 977 days.

(21) Appl. No.: 12/368,024

(22) Filed: Feb. 9, 2009

(65) Prior Publication Data

US 2010/0205212 A1    Aug. 12, 2010

(51) Int. Cl.
G06F 17/00 (2006.01)
G06F 17/30 (2006.01)

(52) U.S. Cl.
CPC .... G06F 17/30539 (2013.01); *G06F 17/30867* (2013.01)

(58) Field of Classification Search
USPC .................................. 707/999.104, 776, 769
See application file for complete search history.

(56) References Cited

U.S. PATENT DOCUMENTS

| | | | | |
|---|---|---|---|---|
| 6,556,659 | B1* | 4/2003 | Bowman-Amuah | 379/9.04 |
| 6,622,168 | B1* | 9/2003 | Datta | 709/219 |
| 7,548,910 | B1* | 6/2009 | Chu et al. | 1/1 |
| 7,827,183 | B2* | 11/2010 | Fraser et al. | 707/748 |
| 8,046,797 | B2* | 10/2011 | Bentolila et al. | 725/46 |
| 2003/0158702 | A1* | 8/2003 | Busche et al. | 702/181 |
| 2004/0128618 | A1* | 7/2004 | Datta | 715/513 |
| 2005/0060343 | A1* | 3/2005 | Gottsman et al. | 707/102 |
| 2005/0278362 | A1* | 12/2005 | Maren et al. | 707/100 |
| 2007/0011188 | A1* | 1/2007 | Chitgupakar et al. | 707/102 |
| 2008/0162574 | A1* | 7/2008 | Gilbert | 707/104.1 |
| 2008/0215565 | A1* | 9/2008 | Sun et al. | 707/5 |
| 2009/0248494 | A1* | 10/2009 | Hueter et al. | 705/10 |
| 2009/0307032 | A1* | 12/2009 | Tribe et al. | 705/7 |
| 2010/0145893 | A1* | 6/2010 | Semizarov et al. | 706/12 |
| 2010/0145894 | A1* | 6/2010 | Semizarov et al. | 706/12 |

OTHER PUBLICATIONS http://www.saffrontech.com/saffron-enterprise.shtml—Saffron Technology, Inc., Feb. 10, 2009.
http://www.sra.com/netowl/—NetOwl Entity Extraction and Text Mining Tools, Feb. 10, 2009.

* cited by examiner

*Primary Examiner* — Hosain Alam
*Assistant Examiner* — Eliyah S Harper (57) ABSTRACT

According to an embodiment, a non-conformance analysis system may include at least one information storage tool that stores previously generated non-conformance information; a data mining tool that retrieves specific attributes of the previously generated non-conformance information stored in the at least one information storage tool; an associative memory subsystem that is populated with information involving a plurality of entity types, with each entity type including at least one entity, to form an associative memory; and a user input device that enables a user to input a non-conformance query into the associative memory subsystem, that causes the associative memory subsystem to generate all of the entity types and entities that include information useful for investigating the non-conformance query.

10 Claims, 6 Drawing Sheets

NON-CONFORMANCE ANALYSIS USING AN ASSOCIATIVE MEMORY LEARNING AGENT

CROSS-REFERENCE TO RELATED APPLICATIONS

The present application is related in general subject matter to pending U.S. patent application Ser. No. 12/368,015, filed concurrently herewith, entitled "Employing Associate Memory Learning Agent For Enhanced Lifecycle Management", assigned to The Boeing Company, and hereby incorporated by reference in its entirety into the present application. The present application is further related in general subject matter to pending commonly assigned U.S. patent application Ser. No. 12/368,047, filed concurrently herewith, entitled "Associative Memory Learning Agent For Analysis Of Manufacturing Non-Conformance Applications," assigned to The Boeing Company, and hereby incorporated by reference in its entirety into the present application.

FIELD

The present disclosure relates to systems and methods for assisting in non-conformance analysis, and more particularly to systems and methods that enable more effective and efficient non-conformance analysis of systems and processes.

BACKGROUND

Statements in this section merely provide background information related to the present disclosure and may not constitute prior art.

A present day challenge is to evaluate the lifecycle of constituent components for complex products or systems using large scale historical databases. Such large scale historical databases may have involved rules based systems, relational databases and query systems, data mining systems and processes, and even human hand analysis. Each of these systems or methods has drawbacks that limit their effectiveness in assisting with rapid non-conformance analysis of products and systems. Non-conformance may include any condition that is at variance with a nominal condition. For example, modern systems and processes are well known and can handle extensive amounts of data. Modern systems often involve data mining solutions that employ predictive data mining techniques such as text mining and clustering. Such data mining solutions can handle large data sets by summarizing them into usable chunks. However, such systems do not allow for whole text capture and are thus limited in their ability to relate entities in a complex and subtle manner.

A specific drawback of modern data mining solutions is that they are typically reductive and can lose a good deal of information. More specifically, these reductive solutions tend to lose the subtleties of the data that is often important in determining the desirable patterns that do not repeat often. Modern data mining solutions can also be time consuming and costly in terms of manpower hours, as well as being CPU intensive. Much of the association data between entities is lost, because one is "forced" into characterizing an entity by pre-defined characteristics. For example, many database systems have drop-down menus that allow only certain categories to be chosen. The categories may not contain enough detail to adequately address all the associations between entities, therefore omitting relationships that can be of significant assistance in determining a desired result or assisting in an analytical process. For example a relational database might force a problem to be described as "connector did not work". However, free text might be used to describe the problem as "connector pin bent" and another problem might say "connector not tightened sufficiently". It is only in the free text that the true nature of the problem can be described. Rules based systems also tend to be fragile and non-reactive to changing business conditions.

Large scale historical databases often have other drawbacks in addition to those described above. For example, large scale historical databases typically contain the system's problem reports, operational histories, process notes and part material codes, etc., and can be extensive in size and reside in multiple, different databases. In addition, such large scale historical databases often contain textual content that is often input by a multitude of designers, producers, operators, technicians, maintenance personnel and other contributors. As a result, differences in documentation approach, the terminology and vernacular used to describe the non-conformance, and spelling are very common.

Thus, there exists a continual challenge to extract actionable information from large volumes of current and historical free text, which leads to a multitude of correlation issues that add to the complexity of lifecycle analysis. This can result in a plethora of computational and analytic problems. The usual result is long analysis mitigation times which lead to high costs, which can be very burdensome, if not unacceptable, for many businesses and governmental operations. Low-cost recurring problems on medium and high complexity systems can often be difficult to discover simply because of the significant time required to perform non-conformance investigations with traditional large scale historical databases.

SUMMARY

In one aspect the present disclosure relates to a non-conformance analysis system. The system may comprise: at least one information storage tool that stores previously generated non-conformance information; a data mining tool that retrieves specific attributes of the previously generated non-conformance information stored in the at least one information storage tool; an associative memory subsystem that is populated with information involving a plurality of entity types, with each entity type being associated with at least one entity, to form an associative memory; and a user input device that enables a user to input a non-conformance query into the associative memory subsystem, that causes the associative memory subsystem to generate all of the entity types and entities that include information useful for investigating the non-conformance query.

In another aspect the present disclosure may comprise a method for performing non-conformance analysis. The method may comprise: storing previously generated non-conformance information; performing a data mining operation to analyze and obtain specific attributes of the previously stored non-conformance information; using analytics and the specific attributes to categorize the specific attributes into a plurality of entity types, with each said entity type including at least one related entity, so that each said entity type and its related entity is categorized in an associative memory; and using an input device to enable a user to input a non-conformance query into the associative memory, the associative memory adapted to provide specific ones of said entities that help the user in investigating the non-conformance query.

In still another aspect the present disclosure relates to a method for forming a non-conformance analysis system. The method may comprise: storing previously generated non-conformance information; data mining the stored, previously generated non-conformance information to obtain specific attributes thereof; using analytics and the specific attributes to categorize the attributes into a plurality of entity types, with each entity type including at least one entity; and using the entity types and the entities to form an associative memory able to generate specific ones of the entity types and specific ones of the entities that include information useful for investigating a new non-conformance condition.

In still another aspect the present disclosure relates to a method for forming an associative learning memory. The method may comprise: defining a plurality of entity types; data mining previously generated information from a plurality of information tools to generate a plurality of entities, where each entity represents an attribute that is categorized under one of the defined entity types; storing the entities and the entity types to form an associative memory; and using entity analytics software to analyze the entities stored in the associative memory and to retrieve specific ones of the stored entities that represent attributes pertinent to a user input non-conformance query.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
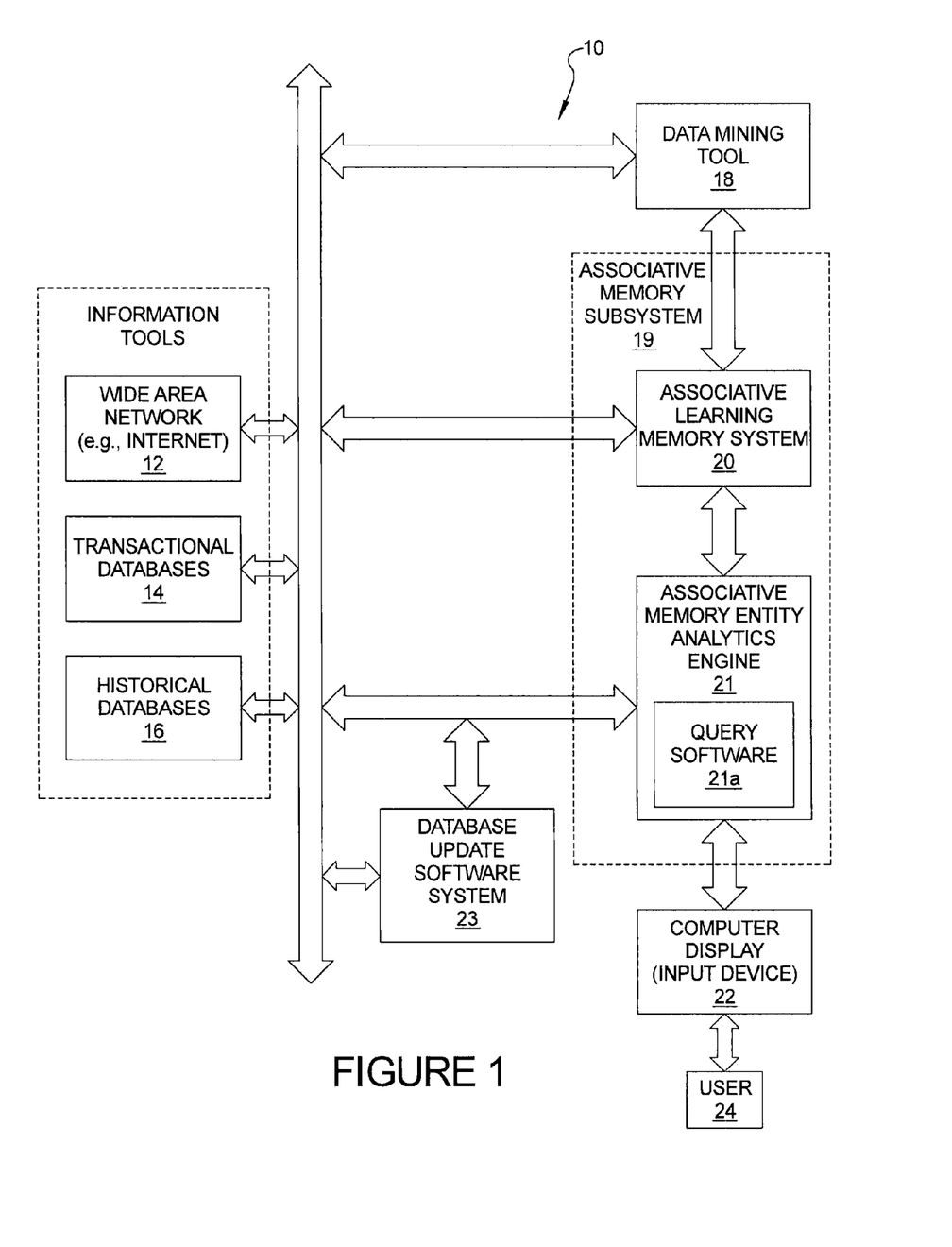
FIG. 1 is a block diagram of a system in accordance with one embodiment of the present disclosure.

Referring to FIG. 1, there is shown a non-conformance analysis system having an associative learning agent 10, and which will be referred to throughout the following discussion for convenience as "the system 10". Non-conformance may include any condition that is at variance with a nominal condition, and may further include, for example, a suspected anomaly, issue, test failure, or problem with a system or portion thereof. The system 10 is suited for use in any application where non-conformance analysis of a system or process is required, and may be part of a lifecycle management information system, tool, or methodology to assist persons in making lifecycle-related decisions. While the system 10 is especially well suited for large, complex systems and products, for example the troubleshooting of commercial aircraft, it will be appreciated that the system may be adapted for use with much smaller and less complex systems, products and methods. The present system 10 is therefore expected to find utility with a wide variety of systems, products and methods where rapid non-conformance analysis and non-conformance identification is required.

Referring to FIG. 1, the system 10 may include one or more diverse independent information storage tools where various forms of non-conformance information may be stored. Three such exemplary information storage tools are illustrated as a wide area network 12 (for simplicity simply "web 12"), one or more transactional databases 14 and one or more historical databases 16. However, it will be appreciated that any type of database or information storage system capable of storing useful non-conformance related information may be used with the system 10. Historical database 16 may be used to store historical non-conformance information concerning subsystems, component parts, vendors or any other criterion that may prove useful in non-conformance analysis. Transactional database 14 may store reports involving specific types of issues previously investigated, for example assembly problems or anomalies, test anomalies, reports by engineers or maintenance personnel on what action was taken to remedy an anomaly or even what repair action(s) had no effect on the anomaly. Transactional database 14 may also contain usage information about the specific platform, subsystem or part; system logs that include platform usage (e.g. operating environment, number of cycles, hours of operation); as well as on-line standards documentation or trade journals that describe problems or changes in materials or manufacturing technology.

As another example of useful information that may be stored in one or more of the databases 14 and 16, consider the situation when there is a change in the way a part for a subsystem is manufactured, and then at some future time other users (or even users in a different industry) discover a problem and report information pertaining to the problem. It might take considerable time to determine that the problem is common across industries. As one specific example, assume that the coating on a wire bundle was changed to reduce environmental impact. The wire with coating is used by many different industries. Now assume that it is typical to mark with stickers to identify (ID) the different wire ends to ID the destination component during manufacturing. Now also assume that the sticker glue is not compatible with the new formulation of the wire bundle coating and causes the wires to short. Now an individual working in one industry discovers the problem and reports the issue in a trade journal. If the relevant information from the trade journal is stored in one or more of the databases 14 or 16, a user in a different industry facing the same or a similar problem may use the system 10 to query and learn all the pertinent information stored that concerns this specific subsystem. The attributes of a given subsystem that makes use of the wire bundle may include that it is made up of this specific type of wire (e.g., part of the bill or materials associated with every subsystem). And because it has this wire attribute, that specific wire will associate this subsystem with the journal entry that describes problems associated with the specific subsystem that uses the wiring bundle.

Thus, it will be appreciated that non-conformances requiring analysis by the system 10 may occur in manufacturing processes, with independent components or parts, with coatings, with raw materials, or may be caused by individuals or even teams of individuals. As such the system 10 may be supplied with whatever form of information or data that may be helpful in performing a non-conformance analysis investigation. The information tools 12, 14 and 16 may also include textual content that has been supplied by a plurality of designers, engineers, scientists, producers, operators, technicians, maintenance personnel and other contributors, so differences in documentation approach, terminology, vernacular and even spelling of non-conformance conditions and related information may be present.

With further reference to FIG. 1 the system 10 also may include a data mining tool 18 and an associative memory subsystem 19. The data mining tool 18 may be in bidirectional communication with the information tools 12, 14, and 16, and also with the associative memory subsystem 19. The associative memory subsystem 19 may include an associative learning memory 20 (hereafter simply "associative memory 20") and an associative memory entity analytics engine 21 (hereinafter the "entity analytics engine 21"). An input device such as a computer display terminal 22 may communicate bidirectionally with the entity analytics engine 21. The associative memory 20 is in bidirectional communication with the entity analytics engine 21. The entity analytics engine 21 may make use of one processor, but more typically a plurality of processors, that operate in connection with entity analytics query software 21a to perform queries for information stored in the associative memory 20. The entity analytics engine 21 receives non-conformance queries from a user via the computer display device 22 and the query software 21a and controls the generation of the pertinent entity types and entities for a given input query by the user. The entity analytics engine 21 converts the words in the non-conformance input query into attributes and retrieves all of the specific entities (relating to various different entity types) that have information that meets one or more of the attributes relating to the non-conformance input query. Any such information is retrieved from the associative memory system 20. By the terminology "attribute" it is meant any piece of knowledge or characteristic such as adjectives, verbs, nouns (e.g., "yellow", "rust", "bent", "dented", "nut", "bolt", "corrosion"); any part number, any process step, any manufacturer name, any assembly line number or build date, any technical or service bulletin, etc., that relates to the non-conformance input query. Thus, an attribute may essentially be any piece of information that might prove helpful in analyzing the non-conformance query.

A database update software system 23 may be used to update the information tools 12, 14 and 16 with any documents created by the user, such as reports concerning a successful fix of a non-conformance being investigated, or any other information that the user wishes to input that may be of interest in future non-conformance analysis of the same problem or similar problems. The entity analytics engine 21 periodically updates the associative memory 20 with new information retrieved from information tools 12, 14 and 16 so that the associative memory 20 will contain all of the entity information available to the system 10 when the system is next accessed for use by a user.

Prior to a first use of the system 10, a system designer defines at least one entity type, but more typically a plurality of entity types that relate to specific categories of information that may be used to help evaluate a non-conformance for a specific application. These entity types are mapped and stored into the associative memory 20. The data mining tool 18 identifies a plurality of entities as it reviews all of the information available in the information tools 12, 14 and 16 and sends the identified information to the associative memory 20 for storage. Thus, each specific entity type may have associated with it at least one, but more typically a plurality of different specific entities. Depending on the application that the system 10 will be used with, dozens, hundreds or more entity types may be defined by the system designer to identify categories of information that may be useful in helping the user to analyze a non-conformance condition. For example and without limitation, entity types may be the names of vendors that supply component parts; mobile platform models; types of parts (e.g., fastener, spring, etc.); the names of customers that own the device or mobile platform being analyzed for a non-conformance; the names of subsystems of the mobile platform, device or system that is the subject of the non-conformance investigation; specific serial numbers of vehicles, subsystems or parts, etc. Entity types can thus be thought of as different categories or types of information (or even different ways or perspectives to remember the information) that may be useful in the non-conformance analysis process.

The specific entities of a given entity type can be thought of as specific objects or groupings that may represent specific items or components related to the application or business. For example and without limitation, an entity type of "fastener" may have several different entities associated with different part numbers for different, specific fasteners. Thus, for an entity type of "fasteners", different entities might exist for a specific style/type of rivet, a specific sized threaded bolt; a specific size of cotter pin, a specific sized nut, etc. One entity would be created for every fastener used by a business. In this example, one entity is created for every different type of fastener that the business uses. As another example, a specific entity type may be created for an "aircraft model", and may have several specific entities associated therewith that each specify a different, specific model of aircraft. As a further example, a specific entity type called "serial number" might be created, and it may have a number of specific, different entities associated therewith that each list a specific serial number. So a free text query by the user for non-conformance information concerning a specific serial number of a part or subsystem may be input to the system 10 by the user and the associative memory query software 21a will search the associative memory 20 for entities stored therein that have a relationship to that specific serial number.

The computer display terminal 22 may be used by a user 24 of the system 10 to input free text queries to the associative memory 20 that pertain to the non-conformance being diagnosed. For example, a free text query might comprise a statement such as: "Wing flap corrosion being experienced on model XXX aircraft manufactured at ZZZ manufacturer at City/State" that is input through the computer display terminal 22 to the entity analytics engine 21. The ability to receive free text inputs is a significant advantage of the system 10 because it enables all data defining the non-conformance to be used in the analysis. Even a word in the free text query such as a noun (e.g., "overtightened", "frayed", "worn", "broken", "bent", "burned", etc.) can represent an attribute that contributes to the entity analytics engine 21 finding related entities stored in the associative member 20 that may help the user with his/her non-conformance investigation. However, even structured information, such as simply a part number or model number, could be entered as the non-conformance query.

Another significant advantage of the system 10 is that it does not make use of reductive algorithms, which can actually eliminate some portions of input information that describe or characterize the non-conformance that could be helpful in troubleshooting the non-conformance condition. Such reductive algorithms typically categorize non-conformances into specific categories (e.g. electrical problem, seat problem, emergency lighting problem, etc.). Thus, the user is able to learn how many "types" of problems are similar to the current problem but is not informed of the problems stored in the associative memory that are most like the current problem Referring now to FIG. 2, a flowchart 100 is shown of operations that are performed by the system 10 during a non-conformance analysis. At operation 102 the specific non-conformance of interest is defined by the user via the computer display terminal 22. Again, as an example, the specific problem might be defined in free text form as a text entry that reads: "Wing corrosion on a model XXX aircraft manufactured by ZZZ company". Alternatively, the user may enter a model name of a mobile platform, a part number of a specific part under investigation; a specific serial number of an assembly under investigation, etc. For the purpose of this example it will be assumed that the user provides a free text query.

Figure 2:
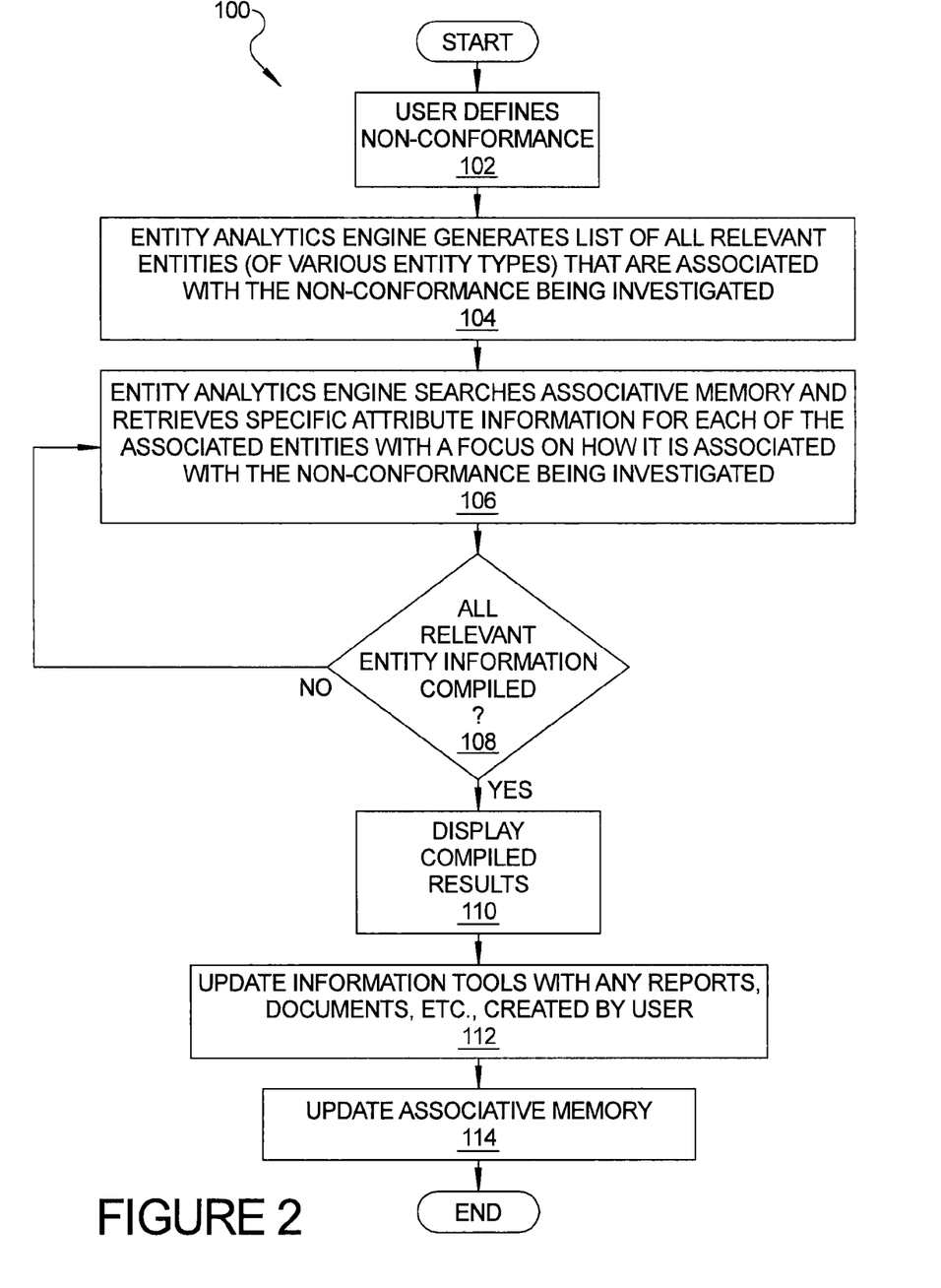
FIG. 2 is a flowchart illustrating one method for constructing the system of FIG. 1.

The system 10 uses the entity analytics engine 21 to perform entity analytics searches on all of the words that make up the free text non-conformance query, as indicated at operation 104. The entity analytics engine 21 will recognize some words as entities and some as simply attributes, but will use each word in the search query in searching for and generating a list of every entity that may have some association with each word in the search query. At operation 106 the entity analytics engine 21 searches the associative memory system 20 to retrieve information having specific attributes for each associated entity. This search is performed with a focus on how the attributes are associated with the non-conformance or problem being investigated. This operation is repeated with successive queries by the entity analytics engine 21, as indicated by query 108, until all the relevant entity and entity type information is compiled. At operation 110, the system 10 may generate a report of the search results that is sent to the computer display terminal 22 for display. This report would include all of the information associated with all entity types and all of the entities for each entity type. Typically this information may be generated within a few seconds or less from the time the user enters a description of the non-conformance being investigated. At operation 112 the information tools 12, 14 and 16 may be updated via the database update software system 23 with any information that the user has created after reviewing the entity type and entity information. At operation 114 the entity analytics engine 21 may update the associative memory 20 with any new information that was stored in the information tools 12, 14 and 16. This updating may involve populating existing entities with additional specific information or even creating new entities (e.g., by adding part numbers of additional parts, as new entities, that have been discovered to be pertinent to the performance or non-conformance of a particular subsystem or component).

Figure 3:
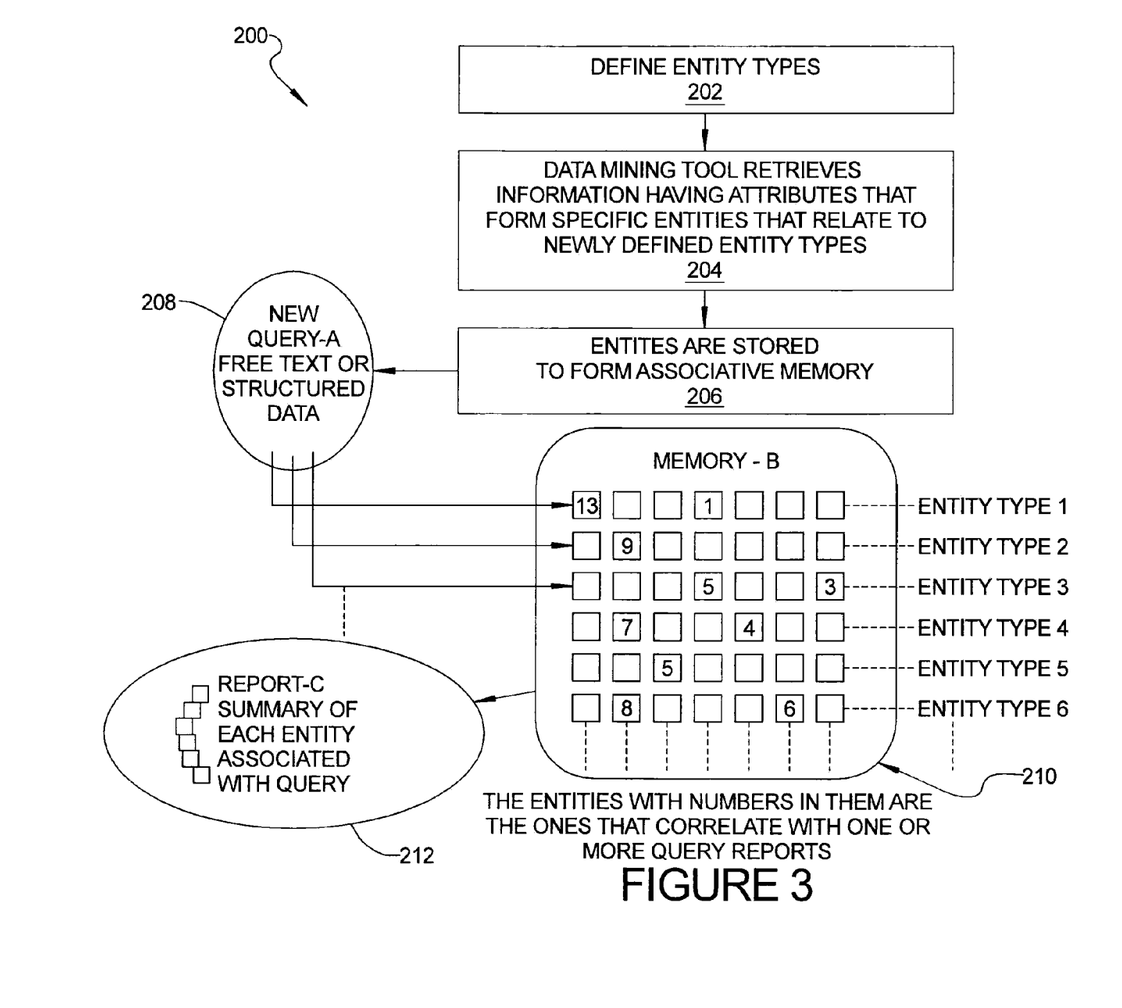
FIG. 3 is a diagram illustrating how the system of FIG. 1 may be used.

Referring now to FIG. 3, a diagram 200 of an operational flow of the system 10 is shown. At operation 202, prior to the first use of the system 10, the entity types that may be pertinent to lifecycle management for a specific application are defined for the associative memory 20 by the system designer. Thus, for example, for non-conformance analysis of a specific commercial aircraft, a specific entity type might be of the major subsystems of the aircraft. This would assume that there could be problems that can be resolved by looking at all the information associated with a major subsystem and not just at individual parts. Such an assumption would likely be an accurate one in this example, because many times problems are clustered around subsystems. For example, assume the user begins investigating a delamination problem. The user could enter a free text query into the computer display terminal 22 with the term "delamination". If most of the delamination issues found by the system 10 were related to a certain subsystem (e.g., a tail assembly), then the tail assembly entity would be displayed to the user.

At operation 204 the data mining tool 18 identifies and accesses all of the information tools to find and retrieve information having attributes that may form specific entities, where the specific entities relate to one or more of the newly defined entity types. At operation 206, all of the retrieved entities have their attributes correlated with one or more of the previously defined entity types and stored to form the associative memory 20. The retrieved information may thus involve historical non-conformance data concerning specific subsystems as well as specific components or parts of specific subsystems. Other exemplary historical data could involve historical repair information, subsystem use data, planned and unplanned maintenance actions and information, and service advisories, just to name a few. Various well known data mining tools exist for this purpose. For example, suitable data mining tools are available from SRA International, Inc. from Fairfax, Va.

At operation 208, when a non-conformance or problem is to be investigated, a user enters pertinent information as free text or as structured data into the computer display terminal 22. At operation 210, the entity analytics engine 21 of the associative memory 20 analyzes all of the terms or structured data input by the user at operation 208, and determines the entity types and entities for which information needs to be obtained from the associative memory 20. Essentially, the associative memory queries performed by the entity analytics engine 21 involve successive queries of the associative memory 20 to obtain all of the relevant information pertaining to the selected entity types and entities. For example, one associative memory query may focus on the word "corrosion" that is part of a free text entry by the user describing the non-conformance condition to be investigated. The entity analytics engine 21 would retrieve all of the pertinent entities types and the specific entities that correlate with the non-conformance information provided by the user. This operation may be viewed as a "knowledge/discovery" operation in which the query software 21a of the entity analytics engine 21 accesses the associative memory 20 to find and extract all of the pertinent, saved non-conformance information available in the associative memory 20 that pertains to the entity types and entities that it has selected. The obtained information is then presented in a logically organized format by the entity analytics engine 21 to the computer terminal 22, as indicated by diagram 212.

Importantly, the entity analytics engine 21, through its repeated searching of the associative memory 20, returns information that also indicates how well correlated the retrieved entities and entity types are with the non-conformance information provided. As one example, the entity analytics engine 21 may indicate with a numerical value how many times a specific entity came up during the multiple memory queries that were performed by the entity analytics engine 21. Alternatively, the entity analytics engine 21 may provide other information that indicates more generically how strongly each of the retrieved entities and entity types are correlated with the non-conformance information input by the user. For example, the strength of correlation of each specific entity could be represented to the user through the use of different colors when displaying the specific entities that are retrieved. For example, if a particular entity came up only once, then the color white could be the background used to display that particular entity on the computer display terminal 22. However, any entity that came up three times or more could be displayed with a red background. These colors could of course be used in addition to numbers to indicate the exact frequency that each particular entity came up. Another alternative to help illustrate the strength of correlation could be the use of different font sizes for numbers displayed for each specific entity. For example, if a specific entity came up only once, it might be displayed in 10 point type size, but any entity that comes up three times or more could have a number associated therewith that is displayed in 16 point size. The resulting entity types and entities retrieved by the entity analytics engine 21, as well as the correlation information it provides, thus present the user with disparate ways (i.e., one for every related entity type) in which to view and investigate the specific non-conformance problem being analyzed. An example of an entity analytics engine available commercially is "SAFFRON ENTERPRISE™" available from Saffron Technology of Morrisville, N.C. It will be appreciated that the entity analytics query software 21a will be constructed by the system designer to recognize those words, numbers or even characters that are important in the specific type of application that the system 10 is being used with.

Figure 4:
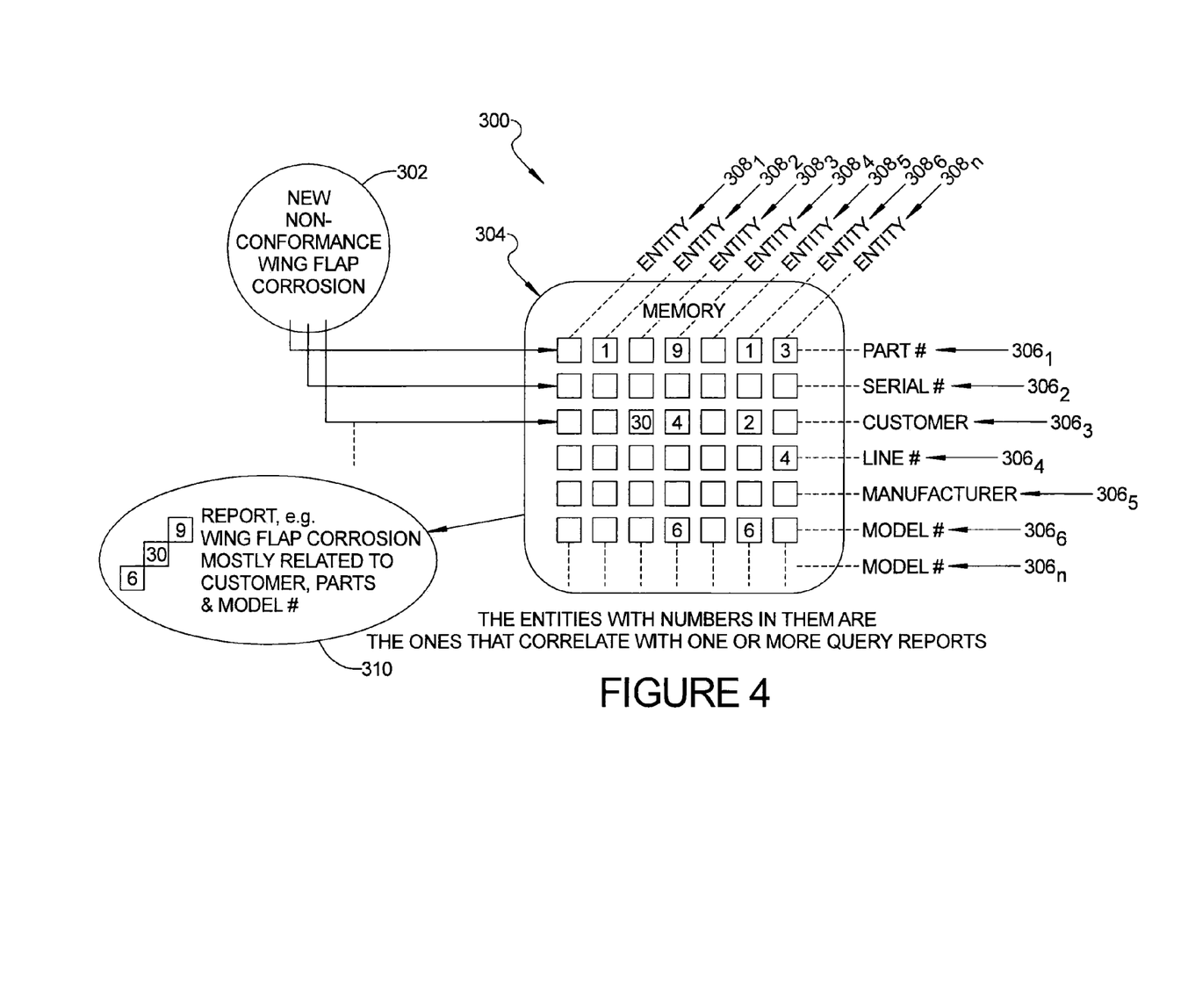
FIG. 4 is a diagram illustrating how the system may be used to obtain non-conformance information concerning a specific problem involving wing corrosion on an aircraft.

Referring now to FIG. 4, an operational diagram 300 is provided to help illustrate a specific example of how the system 10 operates. The specific example relates to the "Wing Flap Corrosion" problem mentioned earlier herein. At operation 302, a free text query may be entered by the user designating "Wing Flap Corrosion" as the non-conformance problem to be investigated. At operation 304 the entity analytics engine 21 sequentially performs a plurality of queries to retrieve from the associative memory 20 the information that pertains to the entity types and specific entities previously selected. The entity types are arranged in rows in this example denoted by reference numbers $306_1$-$306_n$. Thus, in this example the entity types "Part #", "Serial #", "Customer Name"; "Line #"; "Manufacturer Name"; and "Model #" are retrieved as all of the pertinent entity types. In actual practice, however, typically dozens, hundreds or more entity types may be retrieved that all relate to some attribute of the non-conformance information that the user has provided through his/her free text query. All of the entities $308_1$-$308_n$ associated with each of the entity types $306_1$-$306_n$, respectively, are also retrieved. A number may be provided with each entity $308_1$-$308_n$ indicating the number of times that each specific entity turned out to be involved in previous non-conformance investigations. For example, number "9" in the entity box $308_4$ in FIG. 4 might denote that a specific part number was involved in previously investigated wing corrosion non-conformance investigations a total of 9 times. Similarly, the number "30" in entity box of the "Customer Name" entity type row $306_3$ would indicate that a particular customer was somehow involved on 30 occasions with the wing flap corrosion problem being investigated. Likewise, the number "4" in row $306_4$ would indicate that a particular assembly line was involved four times with the wing flap corrosion problem being investigated. Thus, each entity file or record, (which may for convenience simply be termed an "entity box") in every entity type row $306_1$-$306_n$ represents a specific entity, or put differently, a specific piece of information that falls within a specific entity type. An entity $308_1$-$308_n$ that does not have a number indicates that it is not associated with the non-conformance information provided by the user. Each entity box may hold a variable amount of information, for example hundreds of megabytes of information, concerning that specific entity. For example, in an aircraft application, the information might be all the information associated with a specific aircraft model. In another example, an entity box might contain a few bytes of information associated with a part that has never been associated with a reported non-conformance and is not stocked. When a user does a query the entity analytics engine 21 looks at every entity box (from every entity type) and looks for the entity box that has information (associated entities and/or attributes) that best match the information (entities or attributes) in the user's query. The best matches are retrieved and sent to the user.

At operation 310, the information collected from the associative memory 20 at operation 304 may be summarized in a user friendly format to the user, possibly in a printed report or on the computer display terminal 22. From the entity type information, the entity information, and the numbers associated with the occurrence frequency of each specific entity, the user is able to quickly assess which entities may be highly pertinent to resolving the specific non-conformance investigation undertaken. The associative memory 20 effectively retrieves all types of previously stored information that may have a bearing on the specific non-conformance being investigation, as well as retrieving information on specific entities of each entity type that have previously been associated with a similar non-conformance seen in a prior non-conformance investigation.

Figure 5:
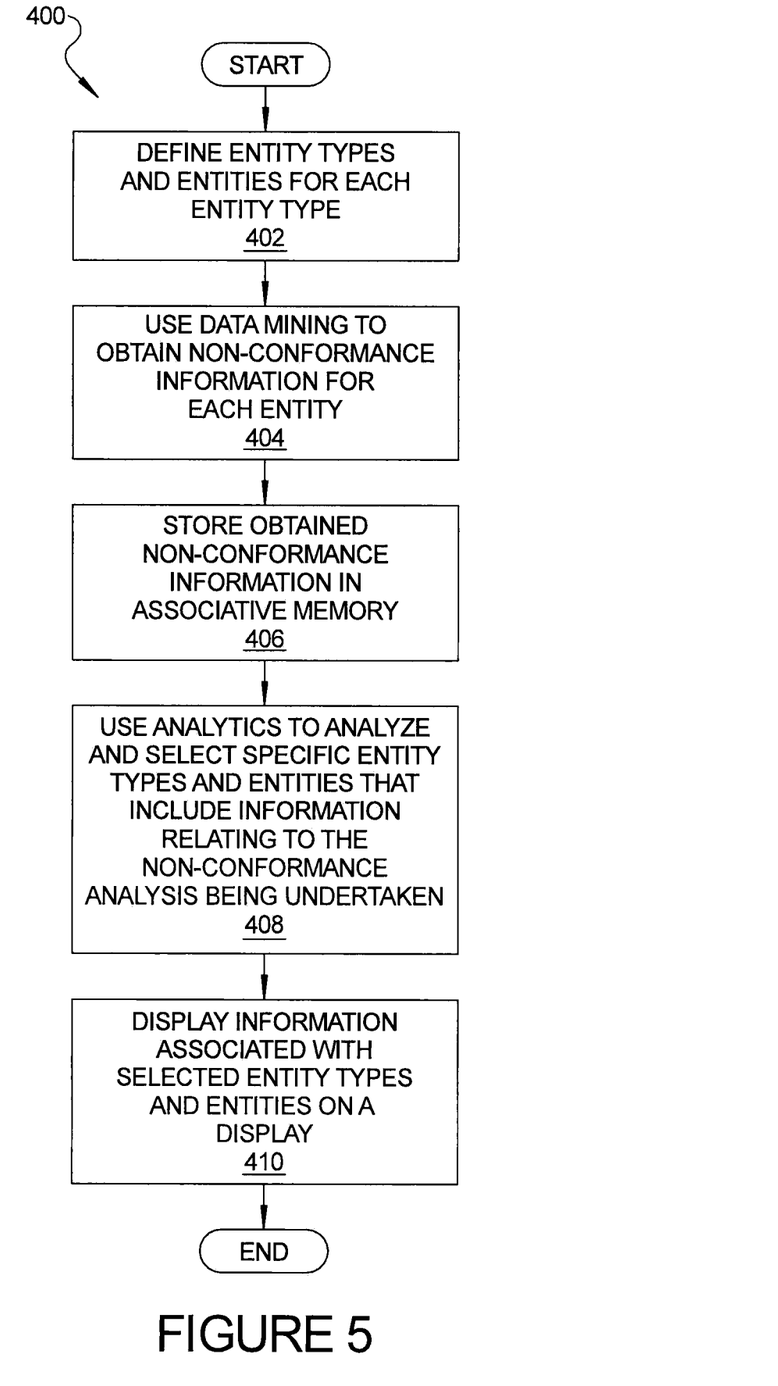
FIG. 5 is a flowchart specifically illustrating operations formed in creating an associative memory for use with the present system.

Referring to FIG. 5, a flowchart 400 is shown of operations that may be performed to form an associative learning memory. At operation 402 a plurality of entity types are defined. At operation 404 data mining of previously stored information from a plurality of information tools is performed to obtain specific information relevant to the entity types that are defined for use in the associative memory 20. At operation 406 specific information (entities and attributes associated with those entities) obtained during the data mining operation is stored in the associative memory 20. At operation 408, analytics are used to analyze the stored, specific non-conformance information and to retrieve specific ones of the entities (of various different entity types) that include information pertinent to the specific non-conformance analysis being undertaken. At operation 410, the obtained entities and the information associated with those entities may be displayed on a suitable display, for example on computer display terminal 22.

Figure 6:
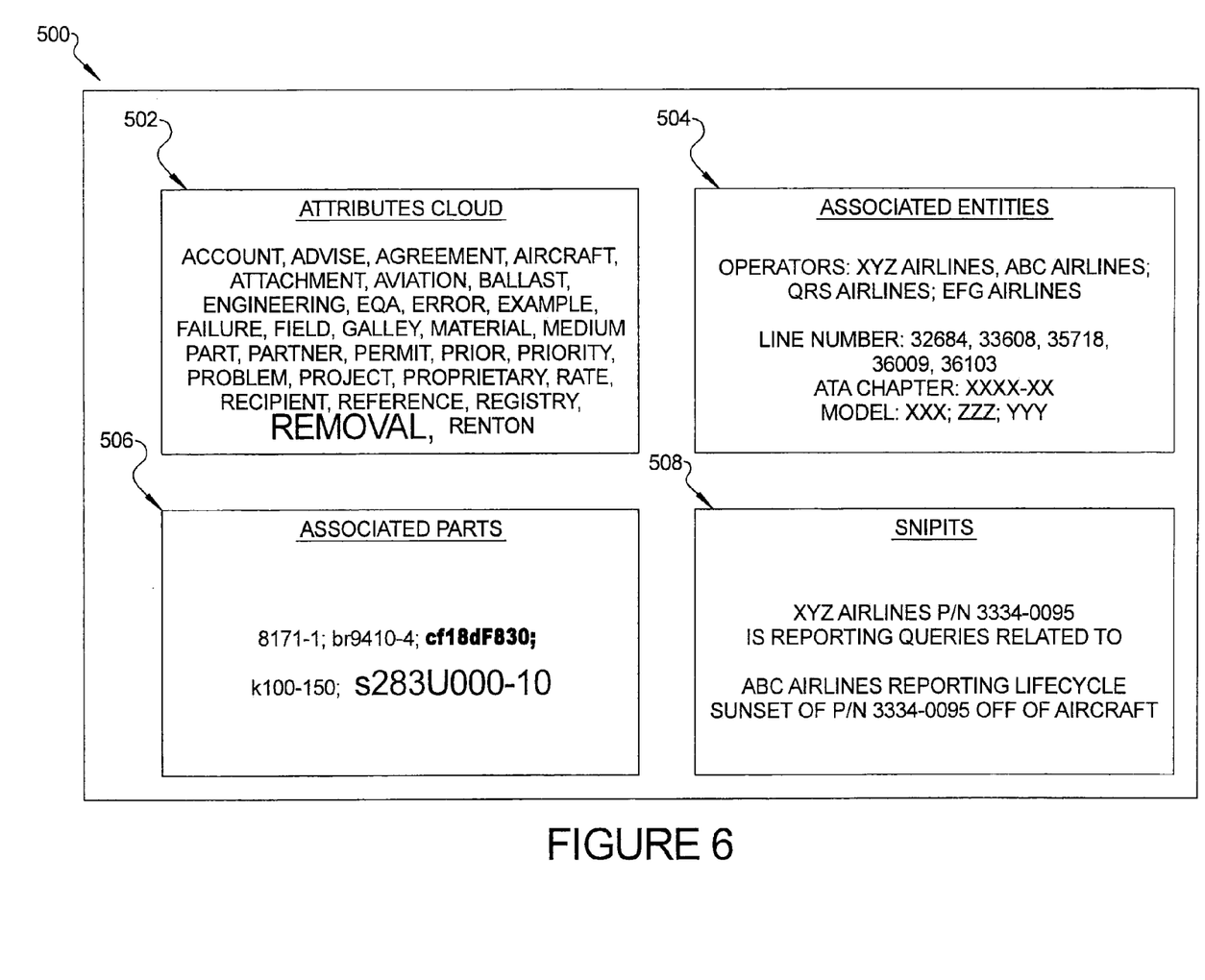
FIG. 6 is an illustration of one exemplary format in which entity type and entity information obtained from the associative memory system may be presented to the user for consideration.

Referring to FIG. 6, one exemplary arrangement is shown in diagram 500 for presenting the entity and entity type information obtained from the associative memory 20 searching to a user. It will be appreciated that this information may be displayed on the computer display terminal 22 or possibly just printed out from a printer (not shown) in communication with the computer display terminal 22. The diagram 500 shows an "Attributes Cloud" box 502, an "Associated Entities" box 504, an "Associated Parts" box 506 and a "Snippets" box 508. The Attributes Cloud box 502 lists attributes (i.e., represented by words) that relate to any of the terms input by the user in the initial non-conformance query. One particular attribute, "removal", is shown in bold print to signify that this attribute came up more frequently than the other attributes as the associative memory 20 queries were performed by the entity analytics engine 21 on the content stored in the associative memory 20. The "Associated Entities" box 504 shows the entity types pulled up from the associative memory searching 20 as being airline "Operators" and "Line Number". The four specific airlines that came up during the searching (i.e., "XYZ Airlines", "ABC Airlines", "QRS Airlines" and "EFG Airlines") imply that these specific four airlines are relevant to one or more of the search terms used in the non-conformance query input by the user. Entity types "ATA Chapter" and "Model" also came up, along with several specific entities for each (e.g., specific aircraft model numbers for the "Model" entity type). This means that these specific entities are involved with, or match, one or more of the search terms used in the non-conformance query. The "Associated Parts" box 506 lists specific part numbers (which represent specific entities) that came up during the associative memory 20 searching that are somehow connected with, or correlated to, one or more of the search terms used in the initial non-conformance query. The last number (i.e., s283∪000-10) is shown in enlarged and bold face print, indicating that it came up more frequently than any other part number during the associative memory 20 searching. The "Snipits" box 508 provides short summaries of particular reports that came up in the associative memory 20 searching, and that involve one or more of the search terms used in the non-conformance inquiry input by the user. From this collective information, the user is able to quickly focus in on those entity types and specific entities that have a direct bearing on the non-conformance being investigated.

The system 10 and method described herein provides a number of significant advantages over previously developed relational databases that have traditionally been used for non-conformance investigation and analysis. A central overall advantage of the system 10 is its ability to rapidly correlate multiple sources and multiple formats of informational data—including free text formats—and present it in such a way that a user can effectively manage the lifecycle of parts, components, systems and subsystems through intelligent queries based on subject matter experts choosing the set of entities.

The system 10 can also answer other related questions without re-building the structure of the memory entities. The advantage of associative memory/entity analytics ("AM/EA") implementations is that because one can have such a large number of different entity types, one can answer and discover different questions. In the associative memory 20 of the present system 10, when something is "observed" by the system 10, it is recorded in the associative memory 20 for every related entity that is observed as being related to the non-conformance information being input by the user. In a relational database the information is typically stored only once in the location chosen by the database designer. Because it is stored in one way it can be accessed only in one way, typically through the key that defines that specific table in a relational database.

Another significant advantage of the system 10 is that the system 10 may use all available non-conformance information/data provided by the user when performing the associative memory 20 queries. It does not, as other previously developed systems typically do, store a summarized version of the information being input by the user in order to reduce the scale of the problem (i.e., the scale of the searching that will be done) to something that works with the technology, and in so doing lose important or otherwise useful facts present in the source data. Existing relational database manipulation tools can find keywords, but the perspective is always that of the relational database designer, not the entity that relates to the current problem. Relational databases also generally do not account for all the entities that reside in the free text information provided by the user. Relational databases further are often slow and difficult to manipulate. The present system 10 can typically provide responses to user inputs within a second or less, while a typical relational database may require significantly longer times to search and obtain relevant, stored non-conformance information.

The system 10 also does not rely on rules based systems, which also may suffer from the drawback of eliminating potentially useful portions of the information contained in the initial non-conformance inquiry made by the user. This is because the "rules" that are used to find "relevant" data by their very nature limit the flexibility of the system to the implemented rules. The other drawback with rules based systems is that the number of rules required will grow with the size of system and the increasing quantity and types of information that must be accessed and searched. So as a rules based system grows larger and larger, it becomes more unmanageable.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system, comprising:
   an associative memory subsystem including a plurality of matrices pertaining to different non-conformances in a platform, each matrix including related entity values and attributes, the subsystem including at least one processor for providing raw, unfiltered correlations between each matrix relative to each of the other matrices; and
   a user interface for inputting a free text query to the associative memory subsystem and displaying identified entity values in order of relevance;
   wherein the at least one processor of the associative memory subsystem uses the free text query to filter the raw correlations to identify those entity values most strongly correlated with the free text query.

2. The system of claim 1, further comprising a data mining tool for retrieving the attributes and the entity values from historical data about past aircraft non-conformances and provides the attributes and the entity values to said associative memory subsystem.

3. The system of claim 2, wherein the associative memory subsystem ranks the identified entity values in order or relevance.

4. The system of claim 2, further comprising a plurality of additional information tools each in communication with said data mining tool, each one of said additional information tools providing information having different attributes and entity values to said associative memory subsystem.

5. A method comprising:
   accessing an associative memory subsystem including a plurality of matrices pertaining to different non-conformances in a platform, each matrix including related entity values and attributes, the subsystem providing raw, unfiltered correlations between each matrix relative to the other matrices;
   using a free text query to filter the raw correlations to identify those entity values most strongly correlated with the free text query; and
   displaying the identified entity values according to how well the identified entity values are correlated with the free text query.

6. The method of claim 5, further comprising performing finding the attributes and entity values in historical data about past aircraft non-conformances.

7. The method of claim 5, further comprising ranking the identified entity values in order or relevance.

8. A method comprising:
   performing data mining on historical data;
   using associative memory to store a plurality of matrices, the matrices pertaining to different aircraft non-conformances, each matrix including related entity values and attributes that were mined from the historical data, the associative memory providing raw, unfiltered correlations between each matrix relative to the other matrices;

using a free text query to filter the raw correlations to identify those entity values most strongly correlated with the free text query; and displaying the identified entity values in order of relevance.

9. The method of claim 5, wherein the nonconformances relate to issues during and after assembly of the platform.

10. The method of claim 9, wherein at least some of the matrices describe a non-conformance using different vernacular.

* * * * *